Dec. 14, 1926.

R. E. HELLMUND 1,610,522

COMBINED FREQUENCY CHANGER AND PHASE CONVERTER

Filed April 26, 1923

WITNESSES:
A. G. Schiefelbein
S. M. Pineles

INVENTOR
Rudolf E. Hellmund.
BY
Wesley G. Carr
ATTORNEY

Patented Dec. 14, 1926.

1,610,522

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

COMBINED FREQUENCY CHANGER AND PHASE CONVERTER.

Application filed April 26, 1923. Serial No. 634,879.

My invention relates to alternating-current dynamo-electric machines and it has special reference to combined frequency changing and phase converting machines which are particularly adapted for use upon electric railway locomotives.

The principal object of my invention is to provide a novel frequency changer and phase converter which is adapted to supply power from a single-phase alternating-current source to a polyphase motor means or aggregate and which is particularly suitable for use in electric locomotives.

A more specific object of my invention is to provide a combined frequency changer and phase converter of the above-mentioned type, having a single stationary magnetic core and a single rotating magnetic core, and to provide windings adapted for simultaneous operation on two pole numbers.

It is well known that locomotives employed on alternating current railway systems are best operated by means of low-frequency polyphase motors or motor aggregates. The transmission of power to such locomotives is, however, most advantageously effected by means of single-phase alternating currents having a standard commercial frequency. Such frequency, for instance, that of the 60 cycle system, is considerably higher than the desired motor frequency. With growing electrification of the railway systems of this and other countries, reasons of economy and service make it increasingly important to utilize the advantages of employing the standard commercial frequency for railway operation. Accordingly, the provision of suitable apparatus permitting the construction of locomotives supplied by standard-frequency currents and driven by low-frequency polyphase motors will have a decisive influence upon the rate at which electric operation of the railways will be adopted.

I have devoted a great amount of study and have conducted numerous investigations in an endeavor to provide a frequency changer and phase converter which meets the requirements of railway service, and I have found that, by the use of a combined winding adapted for operation on two pole numbers, a very simple and efficient machine may be designed which meets the requirements in question.

My invention will best be understood by reference to the accompanying drawings, wherein—

Figure 1:
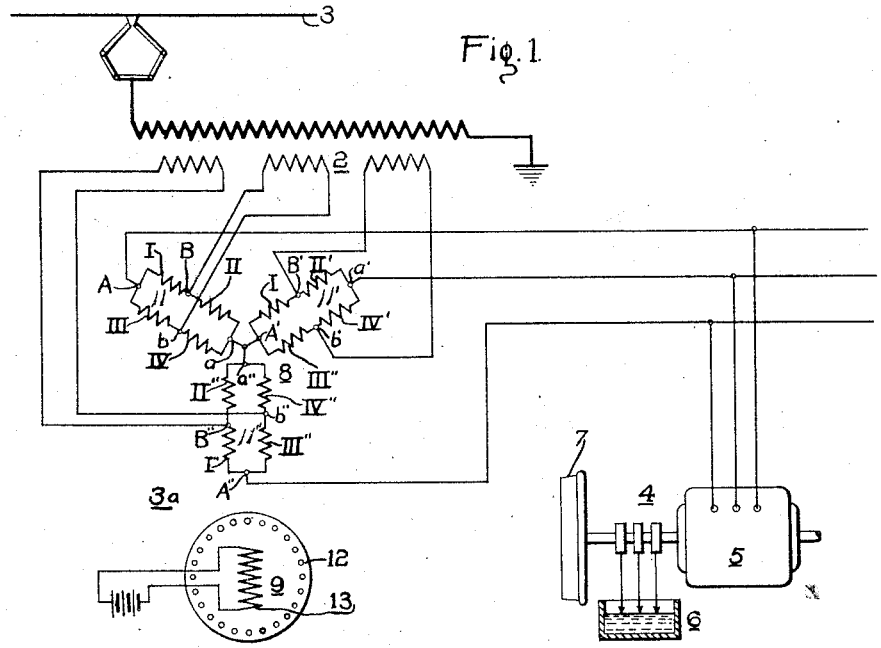
Figure 1 is a diagrammatic view of a driving system of an electric locomotive embodying my invention.

In the system shown in Fig. 1, energy is supplied from a single-phase high-voltage line 3 operating with a standard commercial frequency, say 60 cycles, through a transformer 2 and an alternating current converter $3a$ to a low-frequency polyphase motor means or aggregate 4, propelling a locomotive. I have shown, for purposes of illustration, an induction motor 5 controlled by a secondary liquid rheostat 6 and driving a locomotive wheel 7.

The converter $3a$ consists of a stator 8 and a rotor 9 which may be of a standard induction-motor construction. The stator is shown as being provided with a special combined winding 11, 11', 11", which is designed for simultaneous operation with two pole numbers corresponding to the two frequencies, the supply frequency, say 60 cycle, and a load frequency one-sixth as great, said stator winding furthermore permitting single-phase operation with the larger pole number and polyphase operation with the smaller pole number.

My combined winding for simultaneously carrying the currents of both frequencies in conformity with the above-stated requirements consists of three winding groups 11, 11', 11", corresponding to three phases of the motor aggregate 4. The winding-group 11 consists of four coils or coil-groups I, II, III, IV, having terminals A, $a$, for low-frequency operation and intermediate terminals B, $b$, for high-frequency operation.

The other winding groups 11′ and 11″ are similarly constructed, the composite parts being appropriately indicated by prime marks and seconds. In the drawing, the low-frequency terminals A, a; A′, a′ and A″, a″, respectively, are shown star connected to the load 4. The high frequency terminals B, b; B′, b′ and B″, b″, corresponding to the respective winding-groups, are connected to separate secondary windings on the single phase transformer 2.

The rotor 9 is provided with two windings, a close-circuited winding 12, which may be of the squirrel-cage type, and a direct-current exciting winding 13, which is preferably wound for the smaller pole number and so designed as to be unaffected by the high-frequency rotating field. The direct-current exciting winding may, however, be a double-pole-number winding, or other means may be adopted for securing synchronous operation on the high-frequency side as well as on the low-frequency side. It will be understood, of course, that the precise details of the means for performing the functions of the windings 12 and 13 are not essential to my invention, in its broadest aspects.

The single-phase winding connection of the stator, supplied from the high-frequency source 3, causes the machine to operate as an induction motor in conjunction with the close-circuited rotor winding 12, the rotor having a speed corresponding to the higher pole number of the single phase connections of the stator winding. The direct-current excited winding 13 of the rotor then induces, in the polyphase winding terminals A, a, A′, a′ and A″, a″, alternating currents having a low frequency corresponding to the smaller pole number.

The motor and generator currents flowing in the stator windings 11 will, in general, be oppositely directed and consequently a cancellation of the currents will be effected resulting in a reduction of the losses, and a correspondingly high efficiency of the machine, as will be hereinafter more fully explained.

Figure 2:
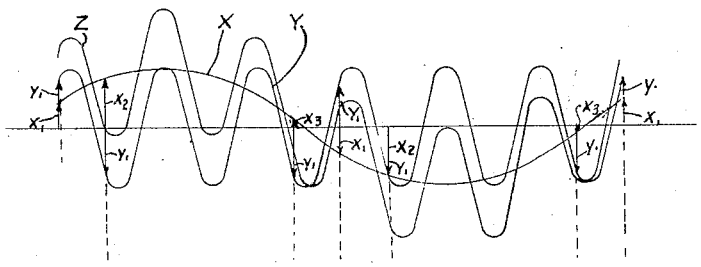
Fig. 2 is a curve diagram of certain operating characteristics of my frequency changer.

The flux distribution is shown in Fig. 2, wherein the curve Y shows the twelve-pole field produced by, or corresponding to, the high-frequency connections B, b; B′, b′ and B″, b″. The two-pole field of the direct-current exciting winding 13 is shown at X, and the resultant total field is shown at Z in Fig. 2.

Figure 3:
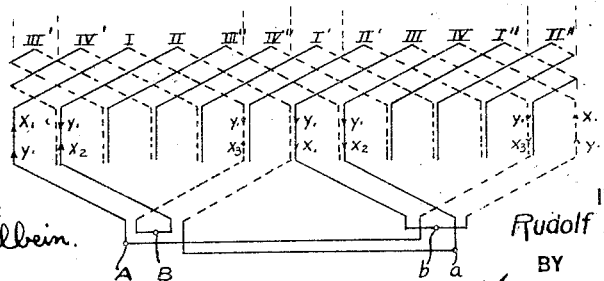
Fig. 3 is a winding diagram showing a development of the stator winding used in the frequency changer illustrated in Fig. 1.

The stator winding 11, 11′, 11″, of which one phase, 11, is shown in development in Fig. 3, is wound in twelve slots, corresponding to the number of poles of the high-frequency connections. In accordance with my invention, the stator inductors are connected in coils or coil-groups I, II, III, IV; I′, II′, III′, IV′; I″, II″, III″, IV″, each coil or coil group having a pitch equal to $(2N+1)$ times the pole-pitch of the higher pole number, where N is any integer, dependent upon the frequency ratio and other conditions desired. It is not essential that every coil shall have exactly the pitch stated, so long as the desired pitch is approximated. In the preferred form of my invention, a six-to-one frequency ratio is obtained with a coil-pitch exactly five times the high-frequency pole-pitch, N being equal to 2.

Another characteristic of my invention is the manner in which the coils are connected as, for example, the coils I, II, III, IV of the winding-group 11. The second coil II is disposed one high-frequency pole-pitch in advance of the first coil I. The third coil III is started in the same slot as the last conductor of the second coil II, thus having a phase shift of $2(N+1)$ high-frequency pole-pitches from the first coil I, and it will be noted that $2(N+1)$ is the frequency ratio while $(N+1)$ is the number of phases of the low-frequency winding. The fourth coil IV is disposed one high-frequency pole-pitch in advance of the third coil III. The coils are connected in a closed circuit in the order I—II—IV—III, with the coil chains I—II and III—IV in parallel for the low-frequency connections, and the coil chains I—III and II—IV in parallel for the high-frequency connections, as shown in Figs. 1 and 3. The other two phases or winding-groups 11′ and 11″ are displaced from the winding-group 11 by 60 or 120 electrical degrees of the low-frequency field, as will be understood by those skilled in the art.

In operation, since there are twelve equi-spaced slots and twelve equi-spaced poles, the twelve-pole component Y of the field induces an instantaneous-voltage $y_1$ of the same magnitude in each of the inductors or coil-sides of the primary windings 11, 11′, 11″, regardless of the relative phases of the two-pole field and the six-pole field. Voltages of three different magnitudes, as indicated at $x_1$, $x_2$ and $x_3$ in Fig. 2, are simultaneously induced in the several coil sides by reason of the two-pole component X of the field, the directions of the induced voltages being indicated on the winding development in Fig. 3.

An inspection of the drawing will show that, with the construction hereinabove described, the instantaneous value of the total voltage induced in the coil-chain I—II is $e_2 = 2x_1 + x_2 - x_3$, the components due to the twelve-pole field cancelling out. The instantaneous value of the total voltage induced in the coil-chain I—III is $e_{12} = 4y_1$, the components due to the two-field cancelling out. Furthermore, it is noted that while the respective phases or winding groups are displaced 120° from one another in the low-frequency terminals, the high-frequency voltages of all the phases are $e_{12}=4y_1$ at the same instant, and hence single-phase operation is necessary with the high-frequency connections and with the particular frequency-ratio of 6:1 as described.

It will be noted that my winding is chorded to have a coil pitch equal to five-sixths of the pole-pitch with respect to the smaller pole-number, and that the coils are not connected in consecutive order, but in the order I—II—IV—III. It will further be noted that, while I have shown a simple embodiment utilizing only one slot per pole of the large pole number, it is obvious that the coil sides may be distributed over a plurality of slots per pole.

Aside from the transformation from single-phase high-frequency power to three-phase low-frequency power, which is particularly useful for railway electrifications, my invention has, for one of its chief advantages, the provision of a transforming means in which the electric currents largely neutralize each other in the windings. Thus, the motoring currents drawn from the high-frequency line oppose the induced electromotive forces $y$, in the respective inductors, while the generated low-frequency currents are in the same direction as the generated voltage $x$ and $x_2$ and opposite to the generated voltage $x_3$. At the particular instant illustrated in the drawing, therefore, the input and output currents are in opposition, with a resultant neutralizing or cancelling action, in four out of the eight coil-sides shown in phase 11 in Fig. 3, thereby indicating a material reduction in the heating losses in the composite stator winding 11, 11', 11".

While the following claims refer to a machine in which the low-frequency winding has two poles, the language is intended to comprehend the multiplication of the winding in machines in which the smaller pole-number is four, six, eight, etc.

Those skilled in the art will recognize that my invention is susceptible of numerous modifications and is also adaptable to other applications than to railway locomotives. I accordingly, desire that only such limitations shall be imposed thereupon as are set forth in appended claims.

I claim as my invention:

1. In a dynamo-electric machine, a winding comprising at least two coils per pole, the coils being serially connected in the order I—II—IV—III, where coils I and II are under one pole and coils III and IV are corresponding coils under a pole of opposite polarity.

2. A dynamo-electric machine winding having an (N+1) phase, low-frequency connection and at the same time having single-phase, high-frequency connections of approximately 2(N+1) times the frequency of the low-frequency connections, where N is an integer greater than zero, said winding comprising a number of coils equal to the pole-number of the high-frequency connection and having a coil-pitch approximating (2N+1) times the pole-pitch of the larger pole-number, the first two coils under the north pole of the low-frequency connection being permanently connected in series and being paralleled by the first two coils under the south pole of said low-frequency connection, thereby providing a group of four coils, the remaining coils being similarly connected in groups of four coils each, the groups being connected in an (N+1) phase circuit for low-frequency operation, and two intermediate connections between the coils in each group to provide a plurality of single-phase circuits for high-frequency operation.

3. A dynamo-electric machine having a winding for simultaneous single-phase operation on a large pole number and polyphase operation on a small pole number, said winding comprising a plurality of coils corresponding in number to the larger number of poles and having a pitch equal to an odd multiple of the pitch of said larger pole number, said coils being connected into polyphase groups having terminals for deriving substantially balanced polyphase currents corresponding to the lower number of poles, each group corresponding to one of said phases, and terminals for deriving from each of said groups in-phase single-phase currents corresponding to the smaller pole-number.

4. A double-pole-number dynamo-electric machine comprising a winding disposed in the same number of slots as the larger pole-number, whereby single-phase operation is obtained with the larger pole-number, and polyphase operation is obtained with the smaller pole-number, each phase of said winding, considered from the standpoint of the smaller pole-number, comprising at least two coils per pole, the coils being serially connected in the order I—II—IV—III, where coils I and II are under one pole and coils III and IV are corresponding coils under a pole of opposite polarity.

5. In a dynamo-electric machine, a three-phase winding, each phase comprising a pair of coils per pole, said coils having a throw of five-sixths of the pole-pitch, the coils of each pair being displaced by one-sixth of the pole-pitch, the coils of each phase being serially connected in the order I—II—IV—III, where coils I and II are under one pole and coils III and IV are corresponding coils under a pole of opposite polarity.

6. A double-pole-number winding for a double-current machine having a six-to-one frequency ratio, comprising a plurality of coils having a coil-pitch approximating five times the pole-pitch of the larger pole-number, successive coils being displaced by one pole-pitch of the larger pole-number, said coils being connected in three phases corresponding to the smaller pole-number, each of said phases, considered from the standpoint of the smaller pole-number, comprising at least two coils per pole, the coils being serially connected in the order I—II—IV—III, where coils I and II are under one pole and coils III and IV are corresponding coils under a pole of opposite polarity, and terminal connections for operating the coil chains I—II and III—IV in parallel for the low-frequency connections, and the coil chains I—III and II—IV in parallel for the high-frequency connections.

7. A frequency-changing system having a six-to-one frequency ratio, comprising a dynamo-electric machine having a composite winding, said winding comprising a plurality of coils each having a pitch of five times the pole-pitch of the larger pole-number, successive coils being displaced by one pole-pitch of the larger pole-number, said coils being connected in three phases corresponding to the smaller pole-number, each of said phases, considered from the standpoint of the smaller pole-number comprising at least two coils per pole, the coils being serially connected in the order I—II—IV—III, where coils I and II are under one pole and coils III and IV are corresponding coils under a pole of opposite polarity, and terminal connections for operating the coil chains I—II and III—IV in parallel for the low-frequency connections, and the coil chains I—III and II—IV in parallel for the high-frequency connections, polyphase connections for said low-frequency terminal connections, and a transformer having three equal insulated winding sections for the high-frequency terminal connections of the respective phases.

8. A frequency-changing system having a six-to-one frequency ratio, comprising a dynamo-electric machine having a composite winding, said winding comprising a plurality of coils each having a pitch of five times the pole-pitch of the larger pole-number, successive coils being displaced by one pole-pitch of the larger pole-number, said coils being connected in three phases corresponding to the smaller pole-number, each of said phases, considered from the standpoint of the smaller pole-number, comprising at least two coils per pole, the coils being serially connected in the order I—II—IV—III, where coils I and II are under one pole and coils III and IV are corresponding coils under a pole of opposite polarity, terminal connections for operating the coil chains I—II and III—IV in parallel for the low-frequency connections, and the coil chains I—III and II—IV in parallel for the high-frequency connections, a secondary winding for said larger pole-number and a unidirectional-current exciting means for said smaller pole-number, polyphase connections for said low-frequency terminal connections, and a transformer having three equal insulated winding sections for the high-frequency terminal connections of the respective phases.

9. In a dynamo-electric machine, a three-phase winding, each phase comprising a pair of coils per pole, said coils having a throw of five-sixths of the pole-pitch, the coils of each pair being displaced by one-sixth of the pole-pitch, the coils of each phase being serially connected in the order I—II—IV—III, where coils I and II are under one pole and coils III and IV are corresponding coils under a pole of opposite polarity, and intermediate connections for each phase for obtaining a different pole number.

10. In a dynamo-electric machine, the combination of a stationary magnetic core and a rotating magnetic core, windings disposed on one of said cores and adapted to operate with two different pole numbers, and other windings disposed on the other of said cores to operate simultaneously single-phase on one frequency and polyphase on another frequency.

11. A dynamo-electric machine for converting currents of one frequency into currents of another frequency comprising a combined winding responsive to two different pole numbers having an even pole-number ratio, a set of single-phase terminals upon said winding responsive only to the effects of a field corresponding to one pole number, and a set of polyphase terminals upon said winding responsive only to effects of a field corresponding to the other pole number, said windings comprising a plurality of coils having a pitch substantially equal to a multiple of the pole pitch of the large pole number, said coils being shifted against each other by a distance substantially equal to said pole pitch.

12. A combined frequency-changing and phase-converting machine comprising a stationary core and a rotating core, a combined winding upon one core adapted for simultaneous operation with two pole numbers having a ratio of 6:1, said winding comprising coils having a pitch equal to five times the pole-pitch of the larger number of poles and spaced apart by a distance equal to said pole-pitch, a set of single-phase terminals upon said winding responsive only to the effects of a field corresponding to the larger number of poles and a set of polyphase terminals disposed intermediate said single-phase terminals and responsive only to the effects of a field corresponding to the small number of poles.

13. In a dynamo-electric machine, a winding adapted for simultaneous operation with two pole-numbers having a ratio of 6:1, said winding comprising coils having a pitch equal to five times the pole-pitch of the larger number of poles and spaced apart at a distance equal to said pole-pitch, terminals and intermediate terminals upon said winding, permitting the simultaneous operation of said winding in connection with polyphase low-frequency currents and single-phase and relatively high-frequency currents.

In testimony whereof, I have hereunto subscribed my name this 20th day of April 1923.

RUDOLF E. HELLMUND.